United States Patent Office

2,919,994
Patented Jan. 5, 1960

2,919,994

FUSED CAST REFRACTORY

Frank C. Steimke, Jr., Florissant, Mo., assignor to Walsh Refractories Corporation, St. Louis, Mo., a corporation of Missouri No Drawing. Application October 30, 1957
Serial No. 693,266

5 Claims. (Cl. 106—57)

This invention relates to fused or hot cast refractories of high purity which have excellent resistance to corrosion by alkaline fluxes and are therefore especially suitable for use as refractories for lining glass melting tanks in which the refractories are in direct contact with molten glass and/or unmelted glass batch.

Fused cast refractories for contact with molten glass have been produced in the zirconia-alumina-silica system, keeping the silica as low as economically possible for maximum resistance to corrosion by molten glass. At the same time, in order to successfully anneal these blocks without cracking, it has been found necessary to add quantities of iron oxide, alkali and alkaline earths, to obtain crack free castings. These oxides all go into the glassy phase, along with all or part of the silica to form a glass of relatively low refractoriness which bonds or cements the high refractory crystalline structure of zirconia and corundum together.

I have found that by heating such compositions in an oxidizing atmosphere to 2550° F. this glassy phase begins to fuse out of the refractory. At 2850° F. this glassy phase becomes fluid enough to run down the face of the refractory. These temperatures are within the limits commonly used for the commercial melting of glass. Under the action of alkaline fluxes in the contents of the glass melting tank the refractoriness of this glassy phase is lowered still further. This glassy phase lowers the overall resistance of the refractory to corrosion by molten glass.

I have also found that in normal use this glassy phase tends to sweat out or come out of the refractory carrying with it quantities of highly resistant zirconia and some quantities of corundum which cause harmful defects in the glass such as cords and stones.

One of the principal objects of the present invention is to make a hot cast refractory with excellent corrosion resistance to molten glass, using substantially an eutectic composition of zirconia-alumina-silica.

Another object of this invention is to incorporate into this composition only high purity raw materials, so the ultimate casting will be very low in impurities, particularly titania and iron oxide.

A further object of this invention is to incorporate into the basic eutectic zirconia-alumina-silica hot cast refractory composition a borosilicate type glass to bond or cement the crystalline phases together, such a glassy phase having higher resistance to corrosion than obtainable with the less resistant sodium-lime-iron oxide-titania-silica bearing glassy phase commonly found in fused cast refractories of similar compositions.

A still further object of this invention is to make a hot cast refractory of excellent corrosion resistance with the smallest amount of alkali and alkaline earths which are consistent with the annealing of the casting during cooling so as to prevent cracking.

These and other objects and advantages will become apparent hereinafter.

The present invention is embodied in a fusion cast refractory of substantially an eutectic composition of zirconia-alumina-silica very low in or substantially free from titania and iron oxide, the glassy phase of this refractory comprising a borosilicate type glass.

It has been found in the zirconia-alumina-silica system that an eutectic composition exists at about 53% alumina, 17% silica, and 30% zirconia. The precision of these values is within plus or minus 2½%. The fusion temperature of this composition is approximately 3270° F. The utilization of this eutectic composition has the advantage that under equilibrium conditions all three phases of the system crystallize simultaneously thus eliminating differential crystallization of the various crystal phases. This results in an intimate intergrowth of the crystalline phases thus producing a strong crystalline mechanical bond. This eutectic composition also has the advantage that the component crystals formed are uniform in size and orientation which is a characteristic natural to eutectic mixtures. No vitreous or glassy phase was observed on cooling melts of this eutectic composition.

It is realized that under the conditions present during the casting process common to this type of refractory, equilibrium conditions are not realized and the fused casting will contain a glassy phase, or phases, along with the component crystals. However, the slow cooling inherent to the process required for the annealing of the castings approaches equilibrium conditions and tends to give the desired characteristics of an eutectic melt.

I have found that melts made from this eutectic composition, using very high purity commercially available raw materials, are very resistant to corrosion by molten glass. For raw materials I may use high purity Bayer process alumina as produced by The Aluminum Company of America, commonly called or sold under the trademark "A–1" or "A–2." As a source of zirconia I may use high purity zircon sand which also contains the necessary silica, or commercially available electric furnace zirconia which contains 5% to 7% silica but which is very low in other impurities. By proper selection of raw materials I have been able to produce castings with less than 0.2% iron oxide and less than 0.1% titania, both of which are detrimental to corrosion resistance.

I have found in the zirconia-alumina-silica system little difference in corrosion resistance results between 12% silica and 17% silica, provided the other glass forming oxides in the melt are carefully controlled. Castings made with 17% silica result in the crystallization of some mullite rather than the more corrosion resistant corundum, so that even with careful control of the glass forming oxides corrosion resistance decreased with a silica content over about 17%.

I have found that the formation of a boro-silicate type glass in substantially the basic eutectic composition of zirconia-alumina-silica increases the resistance to corrosion provided the other glass forming oxides are carefully controlled.

It is extremely difficult to arrive at a definite glassy phase composition through analysis of the casting itself. I have chosen rather to introduce into the casting those components which will form a borosilicate type glass of the desired composition in place in the casting. Presently available commercial borosilicate glasses are produced with the silica plus boric oxide totalling 85% to 93% of the glass composition. Of this total, boric oxide will average from 10% to 12%, alumina may vary from 2% to 6%, with the alkali fluxes varying from 4% to 10%. Calcia and magnesia may or may not be used in the above composition.

I have found that by the addition of small amounts of boric oxide and alkali, or alkaline earths, to the basic eutectic composition of zirconia-alumina-silica a glassy phase of highly desirable corrosion resisting properties is formed in place in the casting, the required amounts of silica and alumina to form the borosilicate type glass being furnished by the basic eutectic composition of zirconia-alumina-silica.

The fusion of the compositions described herein have been made using an electric arc furnace with a water cooled shell, the batch to be fused acting as a lining for the inside of the furnace shell. The fused refractory is poured into a sand, or graphite mold, and annealed in insulation according to common practice for the manufacture of present fused or hot cast refractories.

Examples of compositions of raw batches that have been found satisfactory for the making of fused cast refractories embodying my invention are as follows:

EXAMPLE No. 1

| | Parts |
|---|---|
| Alumina | 52 |
| Zircon sand | 46 |
| Silica flour | 1 |
| Boric acid | 2 |

EXAMPLE No. 2

| | |
|---|---|
| Alumina | 53 |
| Electric furnace zirconia | 15 |
| Zircon sand | 30 |
| Boric acid | 2 |

EXAMPLE No. 3

| | |
|---|---|
| Alumina | 46 |
| Electric furnace zirconia | 7 |
| Zircon sand | 47 |
| Dead burned lime | 1½ |
| Boric acid | 1½ |

EXAMPLE No. 4

| | |
|---|---|
| Alumina | 46 |
| Electric furnace zirconia | 7 |
| Zircon sand | 47 |
| Dead burned lime | 1½ |
| Boric acid | 1 |
| Soda ash | 1 |

EXAMPLE No. 5

| | |
|---|---|
| Alumina | 47 |
| Electric furnace zirconia | 8.4 |
| Zircon sand | 43 |
| Soda ash | 1½ |
| Boric acid | 2 |

EXAMPLE No. 6

| | |
|---|---|
| Alumina | 50 |
| Electric furnace zirconia | 13 |
| Zircon sand | 35 |
| Dead burned lime | 1 |
| Boric acid | 1½ |

While melts with boric oxide as the only glass forming oxide addition to the eutectic composition have shown excellent resistance to corrosion such castings cannot be annealed without cracking. Small additions of an alkaline earth, such as calcia or an alkali, such as sodium oxide, to the composition enables crack free castings of approximately two thirds cubic foot to be manufactured. Since these oxides also go into the glassy phase they should be kept as low as possible. I prefer to use the calcia over the alkali since the former gives a more refractory glass in combination with the boric oxide. The calcia in combination with the boric oxide is also more effective in preventing cracking during annealing than the sodium oxide in combination with the boric oxide. A combination of calcia and sodium oxide can be used with the boric oxide to effectively stop cracking during annealing.

Table I shows the effect of calcia and sodium oxide, in combination with the boric oxide at various silica contents in regard to cracking during the annealing of castings each containing approximately two thirds cubic foot.

*Table I*

| | | Percent $B_2O_3$ | Percent CaO plus MgO | Percent $Na_2O$ plus $K_2O$ | Percent $SiO_2$ | Percent $TiO_2$ | Percent $Fe_2O_3$ |
|---|---|---|---|---|---|---|---|
| 100% Recovery | (1) | 0.84 | 1.60 | 0.06 | 12.8 | 0.14 | 0.09 |
| | (2) | 0.83 | 1.58 | 0.04 | 12.4 | 0.04 | 0.04 |
| | (3) | 0.87 | 2.23 | 0.09 | 11.80 | 0.48 | 0.54 |
| | (4) | 0.57 | 1.60 | 0.58 | 12.12 | 0.14 | 0.09 |
| | (5) | 0.57 | 1.47 | 0.57 | 16.26 | 0.06 | 0.04 |
| | (6) | 0.56 | 1.47 | 0.57 | 12.30 | 0.18 | 0.11 |
| | (7) | 1.64 | 1.47 | 0.12 | 10.20 | 1.95 | 1.13 |
| 50% Recovery | (8) | 0.84 | 1.63 | 0.16 | 10.96 | 0.18 | 0.11 |
| | (9) | 1.14 | 0.07 | 0.87 | 14.90 | 0.07 | 0.04 |
| | (10) | 1.14 | | | 16.48 | 0.09 | 0.04 |
| 0% Recovery | (11) | 1.30 | | | 14.20 | 0.09 | 0.04 |
| | (12) | 1.43 | | | 11.00 | 0.10 | 0.06 |
| | (13) | 3.33 | | | 11.06 | 0.10 | 0.06 |

The effect of titania and iron oxide on cracking, when a borosilicate type glass is present, is also apparent from Example 7 of Table I. Amounts over 1% of either of these two oxides causes the castings to crack.

The castings are tested for resistance to corrosion by building them into a rotary test furnace. This furnace is operated for thirty days at a temperature of 2850° F. Glass batch is fed into the furnace so that the glass is in continuous contact with the face of the refractory for the thirty day period. After completion of the test the refractory castings are carefully measured for the amount of corrosion which has taken place under the action of the molten glass.

Table II shows the results when compositions approaching the eutectic composition, Example 1, Table II, have a borosilicate glassy phase as compared to other compositions which either do not have a borosilicate glassy phase or do not approach the eutectic composition.

*Table II*

| Metal line cut back, inches | Percent $SiO_2$ | Percent $ZrO_2$ | Percent $Al_2O_3$ | Percent $B_2O_3$ | Percent CaO plus MgO | Percent $Na_2O$ plus $K_2O$ | Percent $TiO_2$ | Percent $Fe_2O_3$ |
|---|---|---|---|---|---|---|---|---|
| (1) 0.73" | 16.26 | 34.60 | 46.12 | 0.57 | 1.47 | 0.57 | 0.06 | 0.04 |
| (2) 0.88" | 15.56 | 31.90 | 49.08 | | 2.90 | 0.07 | 0.06 | 0.05 |
| (3) 0.94" | 12.80 | 32.30 | 51.73 | 0.84 | 1.60 | 0.12 | 0.14 | 0.09 |
| (4) 0.97" | 12.12 | 32.20 | 52.17 | 0.57 | 1.60 | 0.58 | 0.14 | 0.10 |
| (5) 1.04" | 12.30 | 33.40 | 51.02 | 0.56 | 1.47 | 0.57 | 0.18 | 0.11 |
| (6) 1.05" | 11.20 | 34.10 | 51.14 | | 3.10 | 0.04 | 0.17 | 0.12 |

The term metal line cut back is well known and understood in the art and refers to the undesirable cutting back or corrosion or wearing away of the refractory at the upper level of the molten glass where it contacts the air.

The corrosion resistance to molten glass increases as the silica content approaches the eutectic composition. The superior corrosion resistance of the borosilicate glassy phase is seen in the eutectic composition when it is compared with a casting of a similar composition using only calcia to form the glassy phase, Example 2, Table II. The total alkali, boric oxide, and alkaline earth additions should not greatly exceed 3%, preferably less, for maximum resistance to corrosion. The total alkali addition should not exceed 1% of the total, the boric oxide not over 1% of the total and the calcia not over 2% of the total if the best results are to be obtained. For miximum resistance to corrosion I prefer to hold the ratio of alkali, such as sodium oxide, to boric oxide not over about 1:1. I prefer to use a higher ratio of calcia to boric oxide of approximately 4:1 since the calcia raises the refractoriness of the borosilicate glass formed over a similar alkali addition. Since both the titania and iron oxide enter the glassy phase and reduce the overall refractoriness I prefer to hold each of these oxides to less than 0.1% and 0.2% respectively.

The eutectic composition of zirconia-alumina-silica with a borosilicate glassy phase has excellent resistance to corrosion by molten glass. In addition, castings of this composition examined after thirty days contact with molten glass, at 2850° F., did not have the glassy phase coming out to the surface of the refractory carrying with it the zirconia and corundum which cause defects in the glass being manufactured. Castings made with similar compositions, with the less resistant soda-lime-iron-titania-silica glassy phase, after the same period of contact with the molten glass contained large amounts of these defect forming oxides embedded in the interfacial glass. In places these accumulations became heavy enough to slide down the face of the refractory and would, in time, be deposited in the molten glass.

This invention is intended to cover all changes and modifications of the examples of the invention herein chosen for the purposes of the disclosure, which do not constitute departures from the spirit and scope of the invention.

What I claim is:

1. A heat cast refractory consisting essentially of zirconia, alumina, and silica, bonded with a borosilicate glass in which the silica in said refractory is between 12% and 22% by weight, the zirconia between 25% and 45% by weight, and the alumina between 40% and 60% by weight, said refractory having between about ½ and 1% by weight of boric oxide and at least one of the alkalies selected from the group consisting of $Na_2O$, $K_2O$, and $Li_2O$ not over 1% by weight and being substantially free from titania and iron oxide.

2. A heat cast refractory consisting essentially of zirconia, alumina, and silica, in which the silica is between 12% and 22% by weight, the zirconia between 25% and 45% by weight, the alumina between 40% and 60% by weight, said refractory having at least one of the alkalies selected from the group consisting of $Na_2O$, $K_2O$, and $Li_2O$ not over 1% by weight, at least one of the alkaline earths selected from the group consisting of CaO and MgO not over 2% by weight, and boric oxide between ½ and 3% by weight, said refractory being substantially free from titania and iron oxide.

3. A heat cast refractory consisting essentially of zirconia, alumina, and silica, having a borosilicate glassy phase, in which the silica in said refractory is between 12% and 22% by weight, the zirconia between 25% and 45% by weight, and the alumina between 40% and 60% by weight, said refractory having between ½% and 1% by weight of boric oxide, the ratio of the alkali to boric oxide not exceeding about 1:1 by weight, the ratio of the alkaline earths, to boric oxide not exceeding about 4:1 by weight, said refractory being substantially free from titania and iron oxide.

4. A heat cast refractory consisting essentially of a composition of zirconia-alumina-silica comprising approximately 16% silica, approximately 35% zirconia, approximately 46% alumina, and ½% to 1% boric oxide, ½% to 1% alkali, 1% to 2% alkaline earths, said refractory being substantially free from titania and iron oxide.

5. A heat cast refractory consisting essentially of zirconia, alumina, and silica, in which the silica is between about 12% and 22% by weight, the zirconia is between about 25% and 45% by weight, and the alumina is between about 40% and 60% by weight, said refractory containing at least one of the alkalies selected from the group consisting of $Na_2O$, $K_2O$, and $Li_2O$ not over 1% by weight, and boric oxide between about ½% and 1% by weight, said refractory being substantially free from titania and iron oxide.

References Cited in the file of this patent

UNITED STATES PATENTS

| | | |
|---|---|---|
| 1,615,751 | Fulcher | Jan. 25, 1927 |
| 2,386,633 | Rigterink | Oct. 10, 1944 |
| 2,730,439 | Houchins | Jan. 10, 1956 |